Patented Oct. 31, 1939

2,178,523

UNITED STATES PATENT OFFICE 2,178,523

PRODUCTION OF HIGH MOLECULAR HYDROXYLATED CONDENSATION PRODUCTS FROM CROTONALDEHYDE

Willi Schmidt, Julius Thewalt, and Alexander Rothhaas, Ludwigshafen-on-the-Rhine, Germany, assignors to I. G. Farbenindustrie Aktiengesellschaft, Frankfort-on-the-Main, Germany No Drawing. Application October 16, 1937, Serial No. 169,516. In Germany October 28, 1936

4 Claims. (Cl. 260—67)

The present invention relates to an improved process of producing high molecular hydroxylated condensation products from crotonaldehyde.

We have found that high molecular hydroxylated condensation products are obtained by condensing crotonaldehyde or aldehydes capable of conversion into the same either alone or in admixture with substances having removable hydrogen atoms and/or reactive double linkages in the presence of alkali alcoholates as condensing agents and catalytically hydrogenating the resulting condensation products. As aldehydes which are capable of being converted into crotonaldehyde there may be mentioned acetaldehyde and aldol. Mixtures of acetaldehyde, aldol and/or crotonaldehyde may also be used for the process. As substances having removable hydrogen atoms or reactive double linkages, which may take part in the condensation, there may be mentioned acetone, methyl ethyl ketone, methyl vinyl ketone, cyclopentanone, cyclohexanone, formaldehyde, isobutylene, diisobutylene, monomeric vinyl compounds, such as vinyl ethers, vinyl esters, acrylic esters, acrylic nitrile, and also maleic and phthalic acid derivatives. By adding these reactive compounds to the condensation mixture, the properties of the alcohols obtained are changed. Thus for example from a mixture of acetone and a preponderating amount of crotonaldehyde there is obtained according to this invention a brittle resin, externally similar to colophony, which contains ester groups in addition to hydroxyl groups, while the alcohols obtained from crotonaldehyde alone are viscous and sticky and have only a low saponification value.

As condensing agents it is preferable to use alcoholic solutions of alkali alcoholates, as for example solutions of sodium methylate, potassium methylate, lithium methylate, sodium ethylate, sodium butylate, mono- and di-sodium glycolate in methanol, ethanol, butanol or other alcohols. The alcoholic solutions used need not be entirely free from water. For example solutions of sodium hydroxide or potassium hydroxide in methanol may be used. The said condensing agents act best, however, in the absence of water.

The condensation is preferably carried out by adding the condensing agent to the aldehyde or the mixture containing the aldehyde. The aldehyde or the mixture containing the aldehyde may, however, be added to a solution of the condensing agent. It is advantageous not to introduce the whole of the aldehyde and condensing agent to be used into the reaction vessel at once, but only a part thereof, the remainder being introduced in portions. In this way the condensation, which takes place with strong evolution of heat, is prevented from proceeding too turbulently. If necessary the reaction must be rendered milder by cooling if it proceeds too turbulently. It is advantageous not to allow the reaction mixture to rise to a temperature substantially above 100° C.; the condensation may also be carried out, if desired, under pressure. The reaction proceeds extremely rapidly. It is therefore possible to carry it out continuously. Thus for example the alcoholic solution of the alcoholate and the aldehyde may flow together into a vertical pressure-tight tower and trickle down over filler bodies.

The condensation product is red-yellow in color and of an oily nature. It may be hydrogenated directly but it is preferably to lead carbon dioxide in and to separate the carbonate thus formed before the hydrogenation.

The hydrogenation is carried out in the liquid phase with known hydrogenation catalysts such as are used for example for the hardening of fats and oils and the reduction of carboxylic acids to the corresponding alcohols. Suitable hydrogenation catalysts are for example nickel, cobalt, copper, and precious metals or salts or oxides of the same or mixtures of the same. The said catalysts may also be deposited on carriers and they may also contain difficultly reducible or unreducible metal oxides. The hydrogenation should, if possible, be carried out below 250° C. It is therefore frequently of advantage to use high hydrogen pressures.

When the hydrogenation is completed, the catalyst is separated in cases when the hydrogenation has not been carried out with a rigidly arranged catalyst. The resulting colorless to pale yellow hydrogenation product is freed from alcohol, which was contained in the condensing agent, and small amounts of readily volatile products by heating. The alcohols of high molecular weight thus obtained are comparatively unitary products. They may be used as assistants for the textile, tanning and related industries, as synthetic resins, plastic masses, softening agents or as intermediate products for the preparation of the same.

The following examples will further illustrate how this invention may be carried out in practice but the invention is not restricted to these examples. The parts are by weight.

*Example 1*

A solution of 50 parts of sodium in 400 parts of methanol is slowly dropped into a solution of 1500 parts of crotonaldehyde and 1500 parts of methanol while cooling to about 10° below zero C. and while stirring vigorously. The reaction mixture becomes dark red and the temperature rises to about 40° C. Towards the end of the addition of the sodium methylate, the temperature falls again. The whole is then stirred for 2 hours at room temperature without cooling. Carbon dioxide is then led into the reaction mixture and, after allowing to stand for several hours, the precipitate formed is filtered off by suction. After the separation of the alkali carbonate, the reaction mixture is considerably paler. It is hydrogenated with 2.5 per cent by weight of a nickel catalyst activated with chromium at 150° C. under a pressure of 200 atmospheres of hydrogen. The product is freed from catalyst by filtration and from methanol by heating, the whole then being heated to from 200° C. to 300° C. under a pressure of 2.5 millimeters (mercury gauge). 70 parts of a viscous oil distil over at 185° C. The residue consists of about 1000 parts of a pale yellow, sticky, viscous resin having the following characteristics: acid value=0, saponification value=7.2, hydroxyl value=165 and iodine value=62.8.

*Example 2*

1400 parts of crotonaldehyde are allowed to flow into a boiling mixture of 1160 parts of acetone and a solution of 10 parts of sodium in 242 parts of butanol. When the turbulent reaction is completed, a further solution of 10 parts of sodium in 242 parts of butanol and a further 1400 parts of crotonaldehyde are added. After 2 hours, carbon dioxide is led into the reaction mixture and after allowing to stand for several hours the precipitate formed is filtered off. The reaction product is hydrogenated as described in Example 1. The butanol and the readily volatile products formed are distilled off up to 156° C. under a pressure of 1 millimeter (mercury gauge). 2777 parts of a strong brittle resin having an acid value of 0, a saponification value of 148, a hydroxyl value of 145 and an iodine value of 66.3 are obtained.

*Example 3*

A solution of 15 parts of sodium in 100 parts of methanol is allowed to flow slowly into a mixture, cooled to about 10° below zero C., of 140 parts of crotonaldehyde, 49 parts of maleic anhydride and 190 parts of methanol while further cooling. When the reaction is completed, cooling is discontinued and the reaction mixture slowly heated to about 90° C. Carbon dioxide is then led into the hot solution; the solution is allowed to cool for some hours and settle, and the precipitate formed is filtered off. The reaction product is hydrogenated in the manner described in Example 1. The hydrogenated product is freed from catalyst and volatile constituents and a pale, salve-like product is obtained having the following characteristics: acid value=0, saponification value=76.3, hydroxyl value 239 and iodine value=18.5.

By a corresponding treatment, (a) 140 parts of crotonaldehyde and 74 parts of phthalic anhydride yield, when using 15 parts of sodium, an almost colorless, soft resin having an acid value of 1.9, a saponification value of 20, a hydroxyl value of 202 and an iodine value of 23.2, (b) 140 parts of crotonaldehyde, 49 parts of cyclohexanone and 5 parts of sodium yield a hard, golden yellow resin having acid value of 0, a saponification value of 11.0, a hydroxyl value of 174 and an iodine value of 56.4, (c) 140 parts of crotonaldehyde, 36 parts of methyl ethyl ketone and 5 parts of sodium yield a dark, solid resin having an acid value of 0, a saponification value of 7.36, a hydroxyl value of 161 and an iodine value of 46.3, (d) 140 parts of crotonaldehyde, 50 parts of acrylic acid ethyl ester and 5 parts of sodium yield a soft, almost colorless, pasty product having an acid value of 0, a saponification value of 13, a hydroxyl value of 300 and an iodine value of 28.1, (e) 140 parts of crotonaldehyde, 36 parts of vinyl ethyl ketone and 5 parts of sodium yield a pale, hard resin having an acid value of 0, a saponification value of 4.6, a hydroxyl value of 182 and an iodine value of 42.7, (f) 140 parts of crotonaldehyde, 57 parts of di-isobutylene and 5 parts of sodium yield a pale, hard resin having an acid value of 0, a saponification value of 2.8, a hydroxyl value of 199 and an iodine value of 45.6, and (g) 140 parts of crotonaldehyde, 47 parts of phenol and 15 parts of sodium yield a golden yellow, solid resin having an acid value of 0, a saponification value of 2.5, a hydroxyl value of 198 and an iodine value of 47.1.

The relative proportions of the initial materials may be varied within wide limits.

*Example 4*

A solution of 10 parts of sodium hydroxide in 100 parts of methanol is added in small portions to a cooled solution of 140 parts of crotonaldehyde in 100 parts of methanol. The temperature rises by about 70° C. In order to complete the reaction, the whole is boiled for an hour on the waterbath.

After treatment with carbon dioxide, the reaction product is hydrogenated in the manner described in Example 1. A pale, somewhat sticky resin is obtained having an acid value of 0, a saponification value of 6.7, a hydroxyl value of 177 and an iodine value of 60.5.

*Example 5*

A solution of 5 parts of sodium in 50 parts of methanol is allowed to drop into a mixture of 140 parts of crotonaldehyde, 60 parts of paraformaldehyde and 100 parts of methanol. When the reaction, which proceeds turbulently and with boiling under reflux, is completed, the reaction product is treated with carbon dioxide and hydrogenated. A pale, brittle resin is obtained having an acid value of 0, a saponification value of 12.3, a hydroxyl value of 350 and an iodine value of 38.5.

*Example 6*

A solution of 15 parts of sodium in 250 parts of methanol is added in small portions to a mixture of 140 parts of crotonaldehyde, 47 parts of phenol, 30 parts of paraformaldehyde and 100 parts of methanol. When the reaction, which proceeds turbulently, is completed, the whole is heated for an hour on the waterbath and the reaction product treated with carbon dioxide and hydrogenated. A pale, brittle resin is obtained having an acid value of 0, a saponification value of 6.8, a hydroxyl value of 207 and an iodine value of 44.1.

If the reaction mixture also contains 57 parts of di-isobutylene, there is obtained by the same treatment a pale, very brittle resin having an acid value of 0, a saponification value of 9.8, a hydroxyl value of 256 and an iodine value of 48.8.

Example 7

140 parts of crotonaldehyde are allowed to flow slowly without cooling into a solution of 5 parts of sodium in 240 parts of methanol. The reaction mixture becomes dark brown in color while boiling vigorously under a reflux condenser. The condensation product obtained is dark, resinous and sticky. It dissolves in a mixture of 200 parts of methanol and 100 parts of cyclohexane. After treating this solution with carbon dioxide, hydrogenating and removing the low boiling constituents, a dark yellow, somewhat sticky resin is obtained having an acid value of 0, a saponification value of 4.2, a hydroxyl value of 208 and an iodine value of 63.8.

What we claim is:

1. In the process of producing high molecular hydroxylated condensation products from crotonaldehyde the step which comprises condensing crotonaldehyde by means of alkali alcoholates and hydrogenating the resulting condensation products.

2. In the process of producing high molecular hydroxylated condensation products from crotonaldehyde the step which comprises condensing an aldehyde capable of being converted into crotonaldehyde by means of alkali alcoholates and hydrogenating the resulting condensation products.

3. In the process of producing high molecular hydroxylated condensation products from crotonaldehyde the step which comprises condensing a mixture of a preponderating amount of crotonaldehyde and a substance selected from the group consisting of aldehydes, ketones, and phenols by means of alkali alcoholates and hydrogenating the resulting condensation products.

4. In the process of producing high molecular hydroxylated condensation products from crotonaldehyde the step which comprises condensing crotonaldehyde by means of alkali alcoholates at temperatures not rising substantially above 100° C. and hydrogenating the resulting condensation products.

WILLI SCHMIDT.
JULIUS THEWALT.
ALEXANDER ROTHHAAS.